(No Model.)
G. B. HART.
HOE OR SHOVEL.
No. 533,169. Patented Jan. 29, 1895.
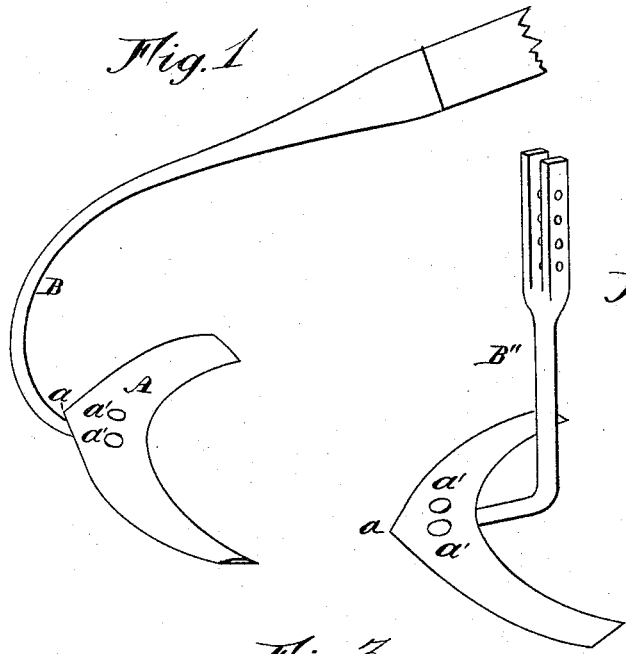
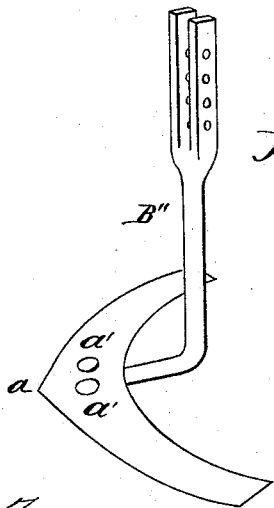
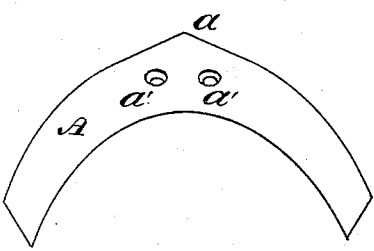
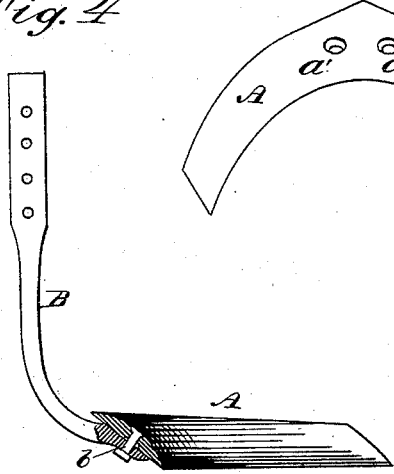
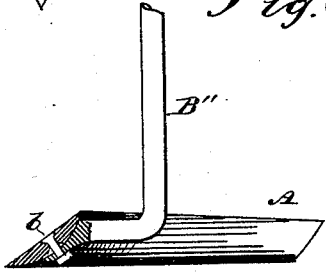
Attest
L. M. Martinek
G. W. Williams.
Inventor
George B. Hart,
By J. M. St. John,
Atty.

United States Patent Office.

GEORGE B. HART, OF VIOLA, IOWA.

HOE OR SHOVEL.

SPECIFICATION forming part of Letters Patent No. 533,169, dated January 29, 1895.

Application filed July 6, 1893. Serial No. 479,737. (No model.)

*To all whom it may concern:*

Be it known that I, GEORGE B. HART, a citizen of the United States, residing at Viola, in the county of Linn and State of Iowa, have invented certain new and useful Improvements in Hoes or Shovels; and I do hereby declare the following to be a full, clear, and exact description of the invention, such as will enable others skilled in the art to which it appertains to make and use the same.

The object of this invention is to so construct a hoe-or-shovel blade as to render it very effective in weeding and stirring the soil, and applicable to a handle for hand use, or to the standard of a garden or field plow, at will.

The invention consists essentially in a crescent-shaped blade, provided with suitable holes for the attachment of a handle or standard, the blade being two-edged, so as to be reversible, as will be hereinafter fully set forth and claimed.

In the accompanying drawings, forming a part of this specification, Figure 1 is a perspective view of a device embodying my invention used as a hoe. Fig. 2 is a similar view of the same reversed, and applied to the standard of a field cultivator. Fig. 3 is a plan view of the blade. Fig. 4 is a transverse section of the same as applied to the standard of a garden cultivator. Fig. 5 is a similar view, but with the shovel reversed, as applied to the standard of a corn-plow.

Similar letters of reference indicate corresponding parts.

The device is a simple one, as will be seen by reference to the drawings.

The blade A is practically crescent-shaped, but with a projecting point or nose at $a$ to give it better penetration when used as a plow. It is provided with suitable holes $a'$ $a'$, which for convenience in attaching either side up, are countersunk on both sides. Both edges of the blade are sharpened, as appears by reference to Figs. 4 and 5. The outer face of the blade is preferably made plane, transversely considered, but as this face is inclined to the plane of the working edges, it is of course curved longitudinally. The opposite side of the blade is convex, being drawn down to edges both ways, as shown. This blade is attached to the handle B, or standard B' by means of bolts or rivets $b$ $b$. When used as a hoe it is attached the convex side up, the points of the crescent projecting toward the operator. The handle is attached at such an angle that the blade will naturally assume the position shown in Fig. 4, the lower edge being plane with the surface of the ground. The curve of the cutting edge renders it a very effective hoe, since the edge has a drawing cut, which enables it the more easily to cut up weeds, or pass through hard soil. It is to be noted that the points are also very convenient in rooting out weeds between plants, or in other places where a broad hoe would not reach them.

By tilting the handle down a little, the points of the hoe blade are brought into use. By holding the handle a little higher than normal the middle of the blade is made to dig, the curvature thereof taking effect through this inclination of the handle.

The attachment to a standard B', for use as a garden cultivator or weeder, is the same as to the handle of a hoe.

For attachment to the standard of a corn-plow B', or the like, the standard should have a hollow at $c$ to fit the convex side of the blade.

It will be seen that the upper edge of the blade in each case projects a little above the point of contact with the handle or standard. The object of this is to enable the soil to pass clear over the blade before reaching the shank of the handle or standard, thus affording it no opportunity to catch and accumulate, as is usual with the ordinary type of hoe.

Having thus described my invention, I claim—

1. As a new article of manufacture, a hoe or shovel blade practically crescent-shaped, sharpened on both edges, both faces of the blade being inclined to the plane of the edges; whereby the blade, when either side up, has a cutting edge inclined to the surface of the ground when the lower edge of the blade is placed level therewith.

2. The combination in a hoe or shovel, of a blade practically crescent-shaped, sharpened on the internal edge, the faces of said blade being inclined to the plane of said cutting edge, whereby it is adapted to cut downwardly when placed level with the ground, and a handle or standard attached to the back face of said blade below and clear of the upper edge, substantially as and for the purpose set forth.

In testimony whereof I affix my signature in presence of two witnesses.

GEORGE B. HART.

Witnesses:
L. M. MARTINEK,
C. M. WILLIAMS.